US011188232B2

(12) United States Patent
McSweeney et al.

(10) Patent No.: US 11,188,232 B2
(45) Date of Patent: Nov. 30, 2021

(54) ENHANCED STORAGE COMPRESSION BASED ON ACTIVITY LEVEL

(71) Applicant: EMC IP Holding Company LLC, Hopkinton, MA (US)

(72) Inventors: Paul J. McSweeney, Cork (IE); Ciara Stacke, Cork (IE); Andrea Graham, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/397,076

(22) Filed: Apr. 29, 2019

(65) Prior Publication Data
US 2020/0341647 A1 Oct. 29, 2020

(51) Int. Cl.
G06F 3/06 (2006.01)
G06F 16/174 (2019.01)

(52) U.S. Cl.
CPC .......... G06F 3/0608 (2013.01); G06F 3/0664 (2013.01); G06F 3/0673 (2013.01); G06F 16/1744 (2019.01)

(58) Field of Classification Search
CPC .. G06F 3/0608; G06F 16/1744; G06F 3/0664; G06F 3/0673
See application file for complete search history.

(56) References Cited

U.S. PATENT DOCUMENTS

| 2007/0223879 | A1* | 9/2007 | Ito | G06F 11/1435 386/241 |
| 2009/0070356 | A1* | 3/2009 | Mimatsu | H03M 7/30 |
| 2016/0191378 | A1* | 6/2016 | Gopisetty | H04L 45/42 709/238 |
| 2016/0364401 | A1* | 12/2016 | Amit | G06F 3/06 |

(Continued)

OTHER PUBLICATIONS

A snapshot of the Linux write man page taken Mar. 14, 2012 that shown write command contains the number of bytes of data to write. This is a snapshot of page https://www.man7.org/linux/man-pages/man2/write.2.html (Year: 2012).*

(Continued)

Primary Examiner — William E. Baughman
Assistant Examiner — Janice M. Girouard
(74) Attorney, Agent, or Firm — Muirhead and Saturnelli, LLC

(57) ABSTRACT

Techniques for evaluating data sets for compression processing may include: receiving first information for a data set, the first information including I/O activity information for the data set, a service level objective for the data set, and a size of the data set; determining, in accordance with the first information, whether the data set meets criteria indicating a specified level of importance and a specified level of I/O activity; responsive to determining the data set meets the criteria, sending second information identifying one or more storage objects of the data set to a compression engine, wherein the one or more storage objects of the data set are identified as having the specified level of importance and at (Continued)

least the specified level of I/O activity; and performing processing, by the compression engine using the second information, to determine whether to compress first data stored in the data set.

16 Claims, 7 Drawing Sheets

(56) References Cited

U.S. PATENT DOCUMENTS

2019/0235758 A1* 8/2019 Constantinescu ... G06F 16/1744

OTHER PUBLICATIONS

EMC Community Network—DECN: Understanding VMAX & PowerMax, "Understanding VMAX & PowerMax Compression," https://community.emc.com/docs/DOC-63153. Jan. 30, 2018-Aug. 31, 2018.

Dell Engineering, DELLEMC "Data Reduction with Dell EMC PowerMax," May 2018.

* cited by examiner

ENHANCED STORAGE COMPRESSION BASED ON ACTIVITY LEVEL

BACKGROUND

Technical Field

This application generally relates to data storage and more particularly to techniques for evaluating when to compress storage.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, an application may executed on the host and the application may issue I/O (input/output) operations, such as data read and write operations, sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for evaluating data sets for compression processing comprising: receiving first information for a data set, the first information including I/O activity information for the data set, a service level objective for the data set, and a size of the data set; determining, in accordance with the first information, whether the data set meets criteria indicating a specified level of importance and a specified level of I/O activity; responsive to determining the data set meets the criteria, sending second information identifying one or more storage objects of the data set to a compression engine, wherein the one or more storage objects of the data set are identified as having the specified level of importance and at least the specified level of I/O activity; and performing processing, by the compression engine using the second information, to determine whether to compress first data stored in the data set. The criteria may indicate that the data set have at least a minimum service level objective. The minimum service level objective may be one of a plurality of predetermined service levels. The minimum service level objective may be a first of the plurality of predetermined service levels, and the first service level may denote a highest service level of the plurality of service levels. The criteria may indicate that the data set have at least a minimum size. The criteria may indicate that the data set is characterized as having a high level of I/O activity if an average observed I/O rate for the data set exceeds a first threshold, or if a measured I/O rate for the data set exceeds a maximum I/O rate at least a specified number of times within a specified time period. The data set may be a storage group of one or more storage objects. The storage objects may include logical devices. At least one storage object may correspond to a portion of a logical address space of a logical device. The storage objects may include one or more virtual storage devices, such as used by virtual machines. The storage objects may include file-based storage objects. The storage objects may include any one or more of: a file, a file system, and a directory. The compression engine may perform activity-based compression. The method may include receiving a first write operation that writes the first data to the data set. A compression setting for a first storage object of the data set may enable compression for the first storage object of the data set. The first data may be stored in the first storage object. The first storage object may be identified in the second information as having the specified level of importance and at least the specified level of I/O activity. The processing performed, by the compression engine using the second information, may include: determining whether the compression setting for the first storage object is enabled; and responsive to determining the compression setting for the first storage object is enabled, performing first processing to determine whether the first storage object has a high level of I/O activity. The first processing may include: determining whether the first storage object of the data set is identified by the second information as having the specified level of importance and at least the specified level of I/O activity; and responsive to determining the first storage object is identified by the second information as having the specified level of importance and at least the specified level of I/O activity, determining not to compress the first data wherein the first data is stored in an uncompressed form.

BRIEF DESCRIPTION OF THE DRAWINGS

Features and advantages of the techniques herein will become more apparent from the following detailed description of exemplary embodiments thereof taken in conjunction with the accompanying drawings in which.

DETAILED DESCRIPTION OF EMBODIMENT(S)

Figure 1:
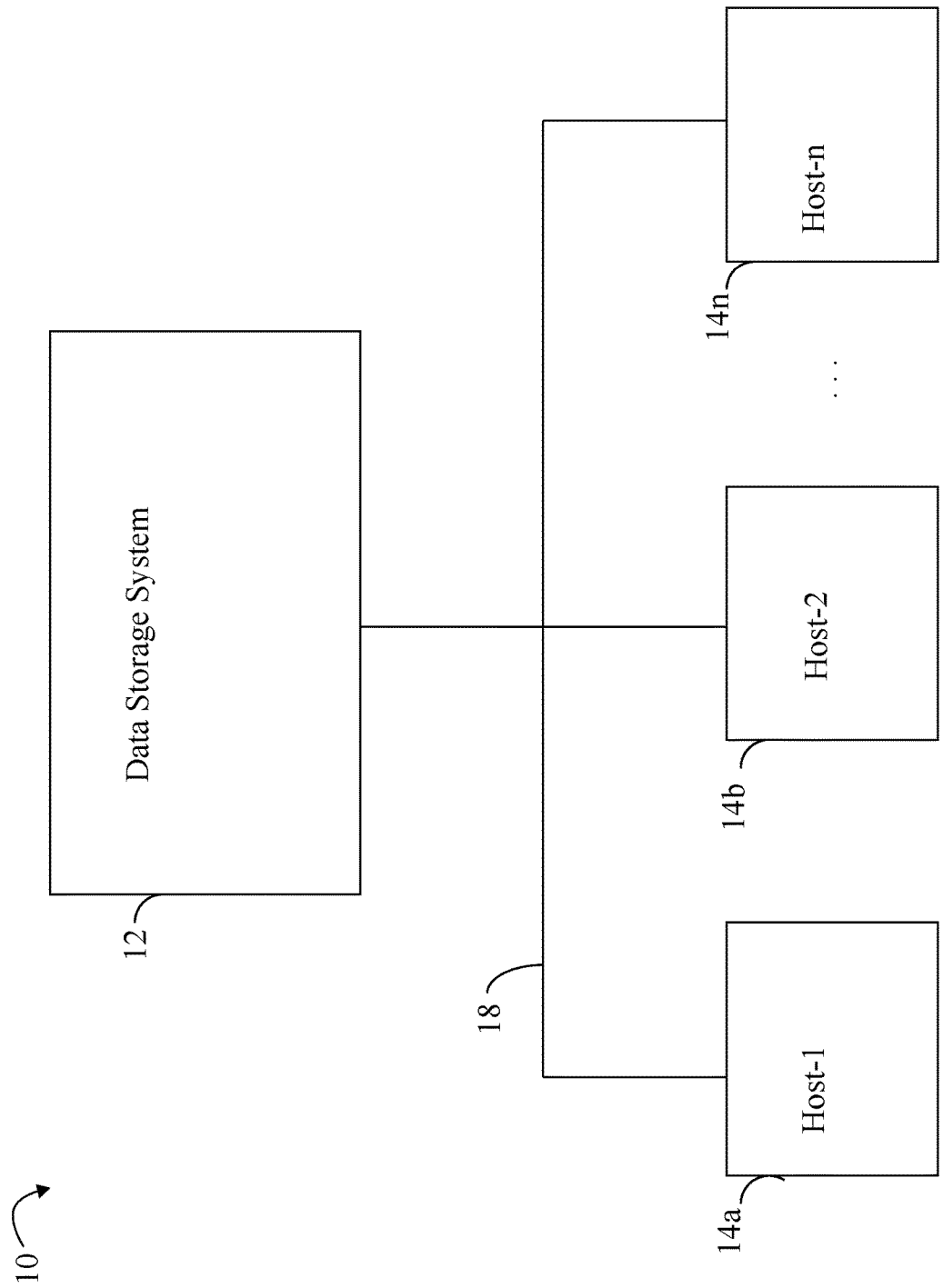
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connection known in the art. For example, the communication medium 18 may be an intranet, network or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system may all be located at the same physical site, or, alternatively, may also be located in different physical locations. The communication medium that may be used to provide the different types of connections between the host computer systems and the data storage system of the system 10 may use a variety of different block-based and/or file-based communication protocols such as TCP/IP, SCSI (Small Computer Systems Interface), Fibre Channel, iSCSI, Fibre Channel over Ethernet, NVMe (Non-Volatile Memory Express) over Fabrics, Network File System (NFS), and the like. Some or all of the connections by which the hosts and the data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
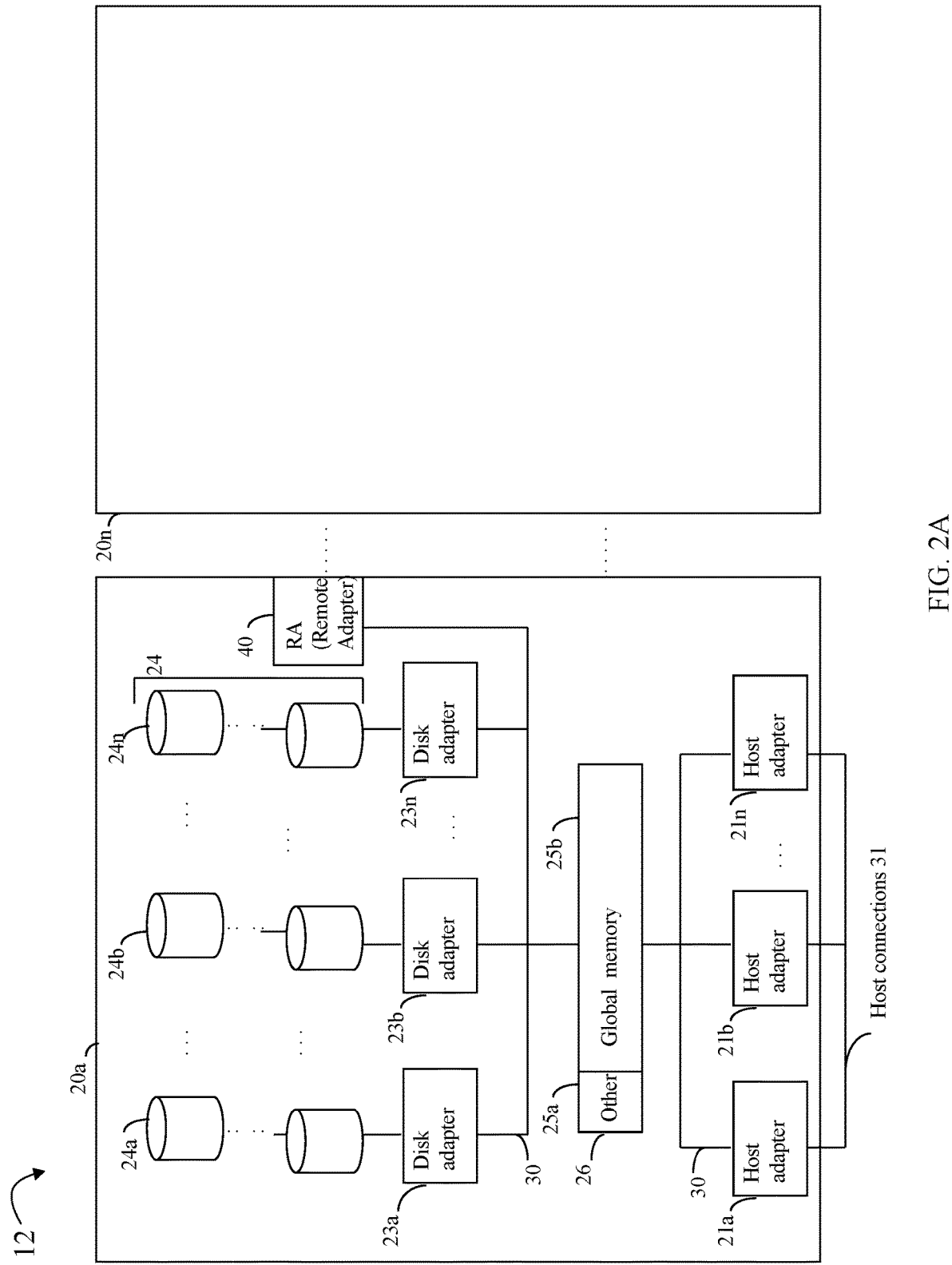
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, the host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of the disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of a suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices, or more generally solid state drives (SSDs), such as SSDs that communicate using the NVMe protocol, and the like.

Also shown in the storage system 20a is an RA or remote adapter 40. The RA may be hardware including a processor used to facilitate communication between the data storage systems, such as between two of the same or different types of data storage systems.

The system 20a may also include one or more host adapters ("HAs") or directors 21a-21n. Each of these HAs may be used to manage the communications and data operations between one or more host systems and the global memory. In an embodiment, the HA may be a Fibre Channel Adapter (FA) or other adapter which facilitates host communication. Generally, the directors may also be characterized as the different adapters, such as the HAs (including FAs), DAs, RAs and the like, as described herein. Components of the data storage system, such as an HA, which may communicate with a host (e.g., receive the host I/O commands and send the responses to the host) may also be referred to as front end components. A DA is an example of a backend component of the data storage system which may communicate with a front end component. In connection with the data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other the disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to the data may be provided to one or more host systems from what the host systems view as a plurality of logical devices or logical units. A logical unit (LUN) may be characterized as a disk array or a data storage system reference to an amount of disk space that has been formatted and allocated for use by one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, the one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and the LUN(s) residing thereon.

The DA physically accesses the back-end non-volatile storage devices, such as the physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to a cache memory (e.g., such as may be included in the component designated as 25b) and marked as write pending. Once written to the cache, the host may be notified that the write operation has completed. At a later point time, the write data may be destaged from the cache to the physical storage device, such as the non-volatile physical storage device (PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time (RT). If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management technique may be used to maintain the cache, for example, such as in determining how long data remains in the cache, whether to prefetch data, selecting data stored in the cache for eviction, and the like.

Figure 2B:
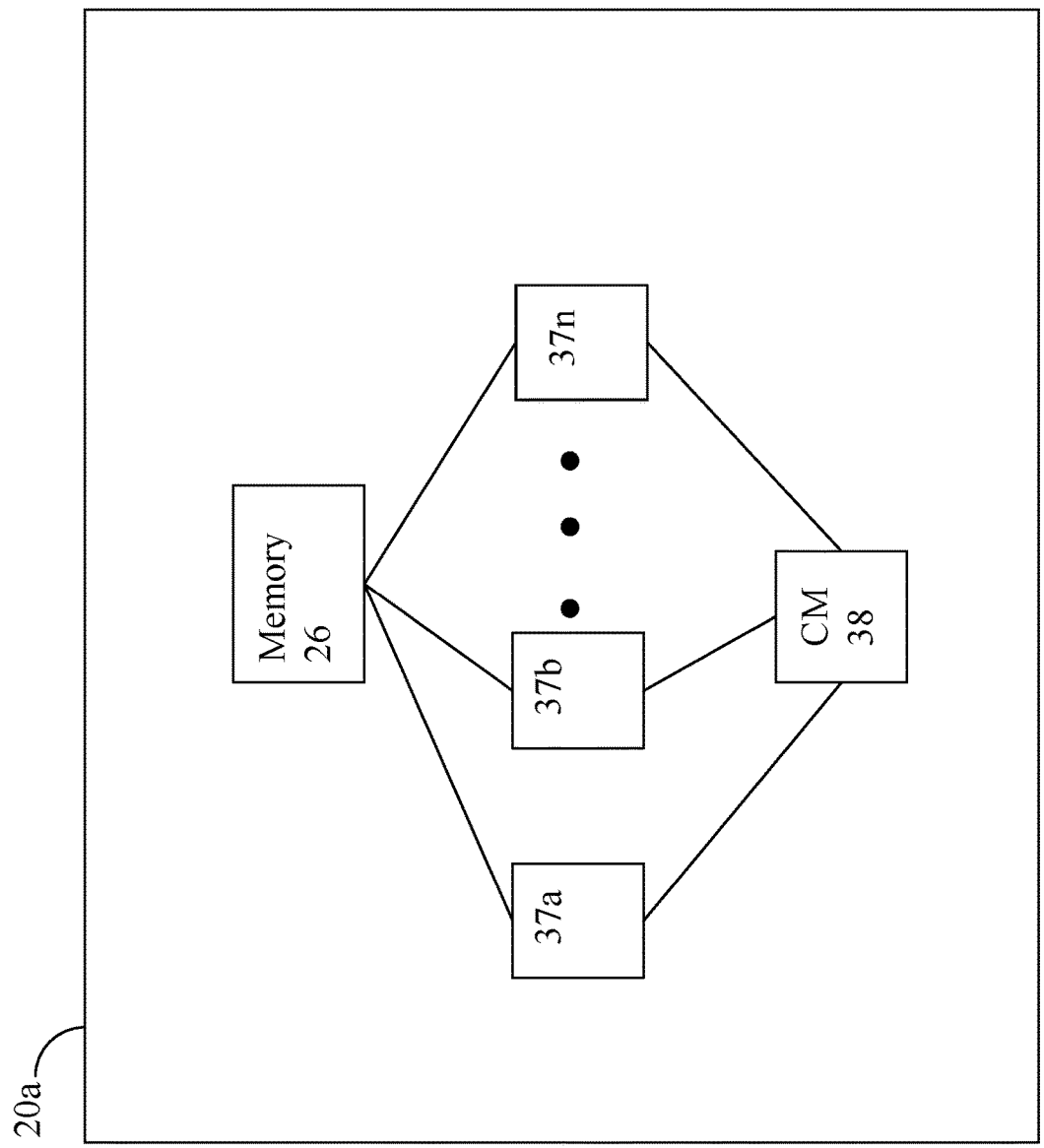
FIG. 2B is a representation of the logical internal communications between the directors and memory included in one embodiment of the data storage system of FIG. 2A.

Referring to FIG. 2B, shown is a representation of the logical internal communications between the directors and the memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with the techniques herein. Those skilled in the art will appreciate that the techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with the techniques herein, the components such as HAs, DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

The data storage system may provide various data services. For example, in at least one embodiment in accordance with the techniques herein, a data storage system may provide one or more data reduction services in efforts to reduce the size of the stored data, for example, stored on the backend non-volatile storage PDs of the data storage system. In at least one embodiment, the data reduction services may include compression. The compression may be performed as a data storage service or operation inline as part of the I/O path or data path, as well as offline, where the compression operation is not performed as part of the I/O path or data path. When compression is performed inline, the compression of a data block, chunk or portion may be performed as part of the I/O path or data path when servicing I/O requests accessing the data block, chunk or portion. In contrast, compression of a data block may also be performed offline. For example, a data set may be written to backend PDs. At a later point in time, such as part of background processing, when the data set is offline/not in use, and the like, processing may be performed to read the data set, compress the data set, and then store the data set in its compressed form.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on a management system connected to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

Compression may be performed by a compression engine comprising software and/or hardware of the data storage system. In some existing systems, the compression engine may assess or evaluate whether a data portion should be stored in compressed or uncompressed form. The evaluation performed by the compression engine may consider the I/O activity of the data portion. The processing performed to collect statistics and monitor the activity level of data portions stored on the data storage system consumes CPU time and can affect I/O RT such as increase I/O RT. Additionally, it is desirable to properly identify data portions having a high level of activity to avoid unnecessary compression and decompression. For example, if a data portion has a high read and write activity level (e.g., is frequently accessed) above a specified threshold level, it may not be desirable to store the data portion in a compressed form to avoid the runtime inefficiencies and overhead of constant compression on writes and decompression on reads.

Described in following paragraphs are techniques that may be used to enhance compression processing and also enhance I/O RT as well as contribute to overall improvement in performance of the data storage system. The techniques may be used for an application's data, such as for a database, and identify whether the application, and thus the application's data, is critical or important. The techniques herein may be used to identify whether I/O performance is important or critical to the application with respect to I/Os issued to the application's data. The techniques may also be used to identify whether the application's data has a high level of activity using specified threshold criteria. In at least one embodiment, criteria may be defined that is used in determining whether an application and its data are considered critical or important, whether I/O performance is important or critical to the application, and whether the application's data is deemed to have a high level of I/O activity whereby the data should not be compressed to enhance runtime performance efficiency. Following paragraphs describe use of the techniques in connection with a database (DB) application that may execute on a host system issuing I/Os to the data storage system. However, more generally, such techniques may be used in connection with any suitable application and are not limited to just DB applications.

In at least one embodiment in which compression is performed inline, the compression engine may evaluate a data portion as it is stored or written to a PD to determine whether to store the data portion in its compressed form or its uncompressed form. An embodiment may perform processing as described herein to evaluate, using criteria, whether a DB storing its data on the data storage system is considered a critical or important application, whether the I/O performance is critical or important to the application, and also whether the application's data is considered to have a high activity level. For a particular data set used by a DB, if the DB is determined to be critical or important, I/O performance is determined to be critical or important, and the DB's data set is considered to have a high level of activity, then information regarding the identified DB data set may be provided as an input to the compression engine.

The information may be used by the compression engine to facilitate identifying data that should not be compressed, as either part of inline processing or offline processing. For example, in at least one embodiment, the information may identify the one or more LUNs, or more generally storage objects, including the DB application's data. In at least one embodiment, the compression engine may then simply determine not to compress any data written to the identified LUNs, or more generally, storage objects of the DB application's data.

As noted above, the techniques utilize criteria to identify particular data that is important or critical in terms of I/O performance as well as highly active with respect to I/O activity. In at least one embodiment, the criteria may include the size of the application data as stored on the data storage system, the I/O activity level of the application data and also the service level or service level objective (SLO) associated with the application data. The foregoing criteria may be used to collectively determine whether an application and the application's data is important or critical, whether I/O performance is important or critical to the application and the application's data, and also whether the application's data as stored on the data storage system is considered to have a high level of I/O activity. In particular, the SLO associated with the application data and the size of the application data may be used an indicator regarding the level of importance or criticality of the application and the application data and the importance or criticality of I/O performance. Additionally, the criteria may further compare the activity level of the application data to one or more thresholds to assess whether the observed activity level of the application data is considered to be a high level of activity.

An embodiment in accordance with the techniques herein may define multiple service levels or SLOs denoting different performance targets or goals. The data storage system may provide a multi-tenant (MT) environment whereby multiple tenants or clients, such as applications, store their data on the data storage system. In such an environment, a different service level objective or SLO may be specified for different data sets that defines a target performance level for the particular data set used by the application. For example, an SLO may be related to a target level of performance or service with respect to I/O operations serviced at the data storage system. The SLO specified may be expressed in terms of one or more metrics, such as based on I/O RT, target I/O throughput (e.g., I/O rate such as I/Os per second), data throughput (e.g., megabytes per second), and the like. For example, the SLO specified may include an average RT with respect to I/Os issued to a particular logical defined data set. To further illustrate, an SLO may specify an average RT of 3 milliseconds (ms.) for a particular data set whereby the target or goal for the data set is to have an observed or measured average I/O RT of 3 ms. the data set, or for each LUN or storage object in the data set. The client, such as the DB application, may also be referred to as a consumer of the data storage system (and data storage system resources) where the consumer's data is stored on the data storage system. A single client or consumer may be, for example, an application executing on a host. A single host may have one or more applications. In at least one embodiment, an SLO may be specified for each logical group of one or more LUNs, such as a storage group (SG) of LUNs. More generally, as noted above, an SLO may be specified for a logical grouping of data storage objects. Additionally, as used herein, and SG may more generally refer to a logical grouping of one or more storage objects, where the storage objects may be generally any storage object (e.g., representing any logical entity or any physical entity, such as a physical storage device or portion of a physical storage device) in the data storage system.

Generally, the SLO for a LUN may be characterized as the performance target or goal performance for the SG. The data storage system may perform processing to control, achieve or regulate I/Os and resources utilized for processing such I/Os in order to maintain the goals or targets of the SLO. An SLO violation may occur, for example, when the LUN's observed I/O RT does not meet the I/O RT specified by the SLO. An SLO violation may occur if the measured or observed I/O RT performance is lower than the target SLO performance (e.g., measured I/O RT>target I/O RT of SLO). Responsive to such an SLO violation not meeting target performance of the SLO, remediation processing may be performed to attempt to alleviate, and, if possible, eliminate, the SLO violation.

Thus, the SLO associated with an SG or other logically defined group of storage objects is one indicator regarding the importance or criticality of the data stored in the SG and regarding the application using such data.

In at least one embodiment, an SLO may be assigned to each defined logical SG of one or more LUNs, as noted above, where each/every I/O directed to any LUN of the SG has the same SLO (as specified for the SG).

In at least one embodiment, SLOs may be specified using the following predetermined service levels, from highest service or performance level to lowest service or performance level: DIAMOND (highest), GOLD, and BRONZE (lowest). Each of the foregoing service levels may have an associated SLO such as a specified RT goal. For example, DIAMOND may have a 1 millisecond RT goal (whereby I/Os directed to a LUN with a DIAMOND SLO may be serviced at the highest priority as soon as possible), GOLD may have a 2 millisecond RT goal, and BRONZE may have a 6 millisecond RT goal. It should be noted that other embodiments may have additional and/or different service levels than as noted above and used elsewhere herein for purposes of illustration.

In at least one embodiment, the compression engine may perform activity-based compression (ABC). With ABC, the goal is to prevent constant compression and decompression of data that is accessed frequently. In at least one embodiment, the ABC function allows the busiest or most frequently accessed data to avoid being compressed regardless of any other SG or LUN compression setting. Allowing frequently accessed data to avoid compression results in a performance benefit with respect to I/Os accessing the data as well as to the overall performance of the data storage system.

Figure 3A:
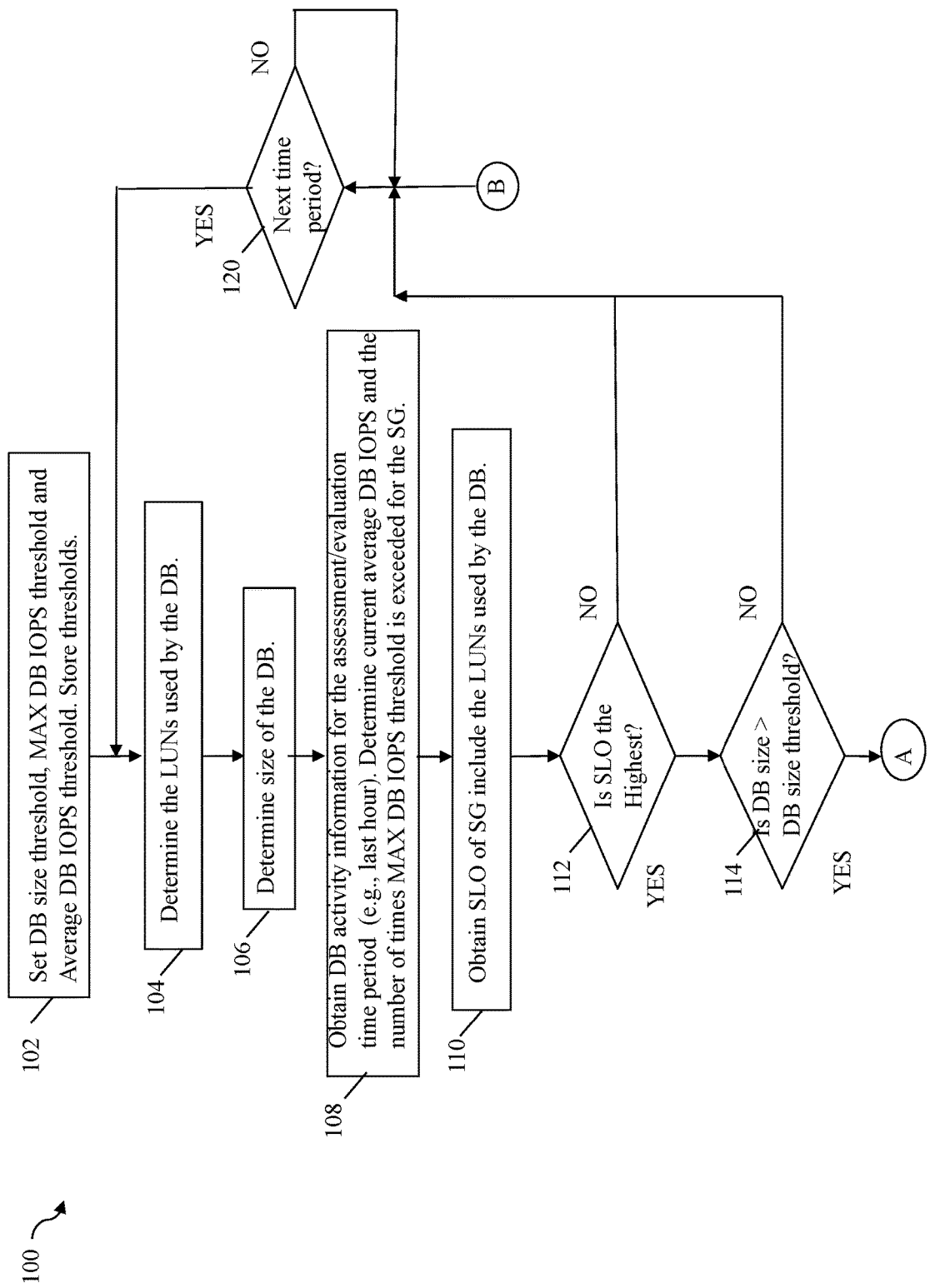
FIGS. 3A, 3B and 4 are flowcharts of processing steps that may be performed in an embodiment in accordance with the techniques herein.
Figure 3B:
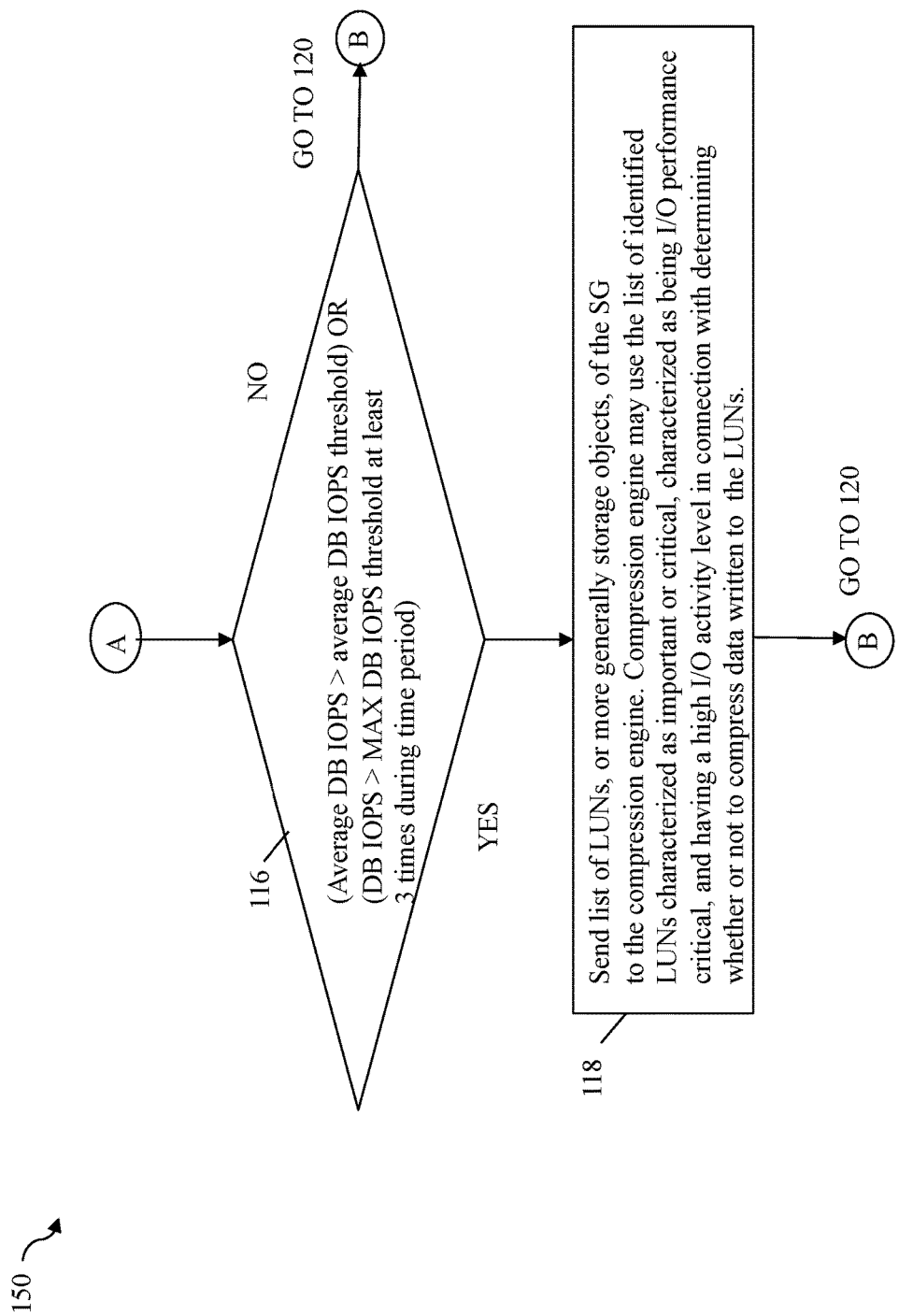

Referring to FIGS. 3A and 3B, shown are processing steps that may be performed in an embodiment in accordance with the techniques herein. The processing of FIGS. 3A and 3B will now be described with respect to a DB application that stores its DB on the LUNs of a SG.

At the step 102, the thresholds of the criteria are specified. The thresholds of the criteria are used in subsequent processing to determine whether the application data is considered important or critical, whether I/O performance is important or critical to the application and the application's data, and whether the application data has a high level of I/O activity. The step 102 may include specifying the data set size threshold which, in this example is the DB size threshold, denoting a size, such as in bytes, megabytes, gigabytes, and the like. The DB size threshold denotes a minimum size of the data set, such as the total amount of data currently stored by the DB application. The step 102 may include specifying a maximum application IOPS (I/Os per second) threshold which, in this example, is the MAX DB IOPS threshold, denoting a maximum I/O rate with respect to I/O issued by the application. The step 102 may include specifying the average application IOPS threshold which, in this example, is the average DB IOPS threshold, denoting an average I/O rate with respect to I/Os issued by the application. The step 102 may include storing the foregoing 3 thresholds in a storage management DB for the particular SG or more generally for the particular data set of logical storage entities. In this manner, the storage management DB may track and associate a different set of thresholds for each desired data set for use with the techniques herein. From the step 102, processing proceeds to the step 104.

At the step 104, processing is performed to determine the particular LUNs, or more generally storage objects, used by the DB application. The step 104 may include reading information from the storage management DB regarding the particular LUNs included in the SG used by the DB application for which processing is now being performed. Generally, the particular storage objects, such as the LUNs included in the SG may be specified and determined in any suitable manner. For example, in at least one embodiment for at least one application, the LUNs or storage objects of the SG may be explicitly specified by a user configuring or defining the SG. In at least one embodiment for at least one application, the LUNs or storage objects of the SG may be automatically determined implicitly. For example, a component on the host may monitor I/Os sent to the data storage system from the host. The component may track which LUNs or storage objects are used by each of the different applications executing on the host. The component may then provide such information to the data storage system for its use and for storing in the storage management DB. From the step 104, processing proceeds to the step 106.

At the step 106, the current size of the DB, or more generally data set, is determined. The step 106 may include reading information from the storage management DB, for example, regarding the current used capacity of each of the LUNs of the SG used by the DB application. The current size may be the sum or total of all used storage of the LUNs in the SG. From the step 106, processing proceeds to the step 108.

At the step 108, processing is performed to obtain, from the storage management DB, the I/O activity for the SG for the current assessment or evaluation time period. For example, the step 108 may include obtaining the I/O activity information for the SG for the last hour where the time period is hourly. From such I/O activity information collected for the last hour, a current observed or measured average hourly rate of the DB IOPS for the SG is determined. Also, from such I/O activity information collected for the last hour, the number of times, N, is determined that the observed DB IOPS for the SG exceeded the MAX DB IOPS threshold in the last hour.

In a special case where this is the first time processing of the FIGS. 3A and 3B is performed for this particular SG, the step 108 may include obtaining historical I/O activity information for the SG from the storage management DB, for example, for the last month or other specified prior window of time. Such historical data may then be further analyzed to obtain the current observed or measured average hourly rate of the DB IOPS for the SG. Such historical data may be further analyzed to determine, for each hour, the number of times, N, that the observed DB IOPS for the SG exceeded the MAX DB IOPS threshold. Then with respect to all the hours in the window of time, select the particular hour H having the largest such value for N, the number of times that the observed DB IOPS exceeded the MAX DB IOPS threshold. From the step 108, control proceeds to the step 110.

At the step 110, processing is performed to obtain the SLO of the SG including the LUNs used by the DB application. The step 110 may include reading information from the storage management DB regarding the SLO specified for the SG. For example, the SLO assigned to the SG may be one of the predefined SLO levels in an embodiment as described herein. For example, the SLO assigned to the SG may be DIAMOND denoting that the associated SG, the application accessing such data, is considered important or critical and also that I/O performance is critical or important for the application and the application's data. From the step 110, processing proceeds to the step 112.

At the step 112, a determination is made as to whether the SLO of the SG is the highest of all defined SLOs. Generally, the step 112 may determine whether the specified SLO for the SG is at least a specified minimum performance level. If the step 112 evaluates to no, control proceeds to the step 120 where nothing further is done for the current time period for the current SG. If the step 112 evaluates to yes, control proceeds to the step 114. At the step 114, as determination is made as to whether the DB size exceeds the DB size threshold. If the step 114 evaluates to no, control proceeds to the step 120 where nothing further is done for the current time period for the current SG.

At the step 120, processing is performed to determine whether the next time period has elapsed. In at least one embodiment, the processing beginning in the step 104 may be repeated at periodic time intervals such as hourly. Thus, in such an embodiment, processing remains in step 120 until the next hour time interval at which the step 120 evaluates to yes, If the step 120 evaluates to no, control remains at the step 120. If the step 120 evaluates to yes, control proceeds to the step 104.

If the step 114 evaluates to yes, control proceeds to the step 116. At the step 116, a determination is made as to whether current values for metrics regarding the I/O activity level of the application data exceed the specified thresholds. In particular, the step 116 determines whether the current average DB IOPS (as determined in the step 108) is greater than the average DB IOPS threshold, or whether the observed DB IOPS (as determined in the step 108) for the SG has exceeded the MAX DB IOPS threshold more than a specified number of times, such as 3, in the last hour or other time period. Generally, the specified number of times may be any suitable number and is not limited to 3 used for purposes of this example. Thus, the step 116 evaluates to yes if at least one of the two conditions (e.g., condition 1: current average DB IOPS>average DB IOPS; condition 2: the observed DB IOPS exceeds MAX DB IOPs at least 3 times) evaluates to true with respect to the last time period. If the step 116 evaluates to no, control proceeds to the step 120. If the step 116 evaluates to yes, control proceeds to the step 118.

In a special case where this is the first time processing of the FIGS. 3A and 3B is performed for this particular SG, the step 116 may include using the current observed or measured average hourly rate of the DB IOPS for the SG based on the historical data for the prior window of time as performed in the step 108. Additionally, for the particular hour H identified in the step 108 for the prior window of time, such as the last month, the number of times, N, that the observed DB IOPS for the SG exceeded the MAX DB IOPS threshold during hour H may be used as the observed number of times that the DB IOPS exceeded the MAX DB IOPS threshold in the step 116 processing.

It should be noted that an evaluation of yes at the step 116 means that the SG being evaluated by the processing of FIGS. 3A and 3B has determined that the SG or application data, and thus the application, is critical or important (e.g., exceeds the DB size threshold and has the highest SLO), that the I/O performance of the application with respect to the application data is important or critical (e.g., has the highest SLO) and also that the SG has a high level of I/O activity exceeding at least one specified I/O activity threshold condition (e.g., one of the 2 thresholds in the step 116).

At the step 118, processing is performed to send information to the compression engine. The information may include the LUNs of the SG just processed whereby the LUNs are identified as critical or important, and the LUNs are identified as having a high level of I/O activity. Additionally, for the LUNs identified, it has been determined that I/O performance is critical or important for an application accessing the LUNs. More generally, the information sent to the compression engine may include the storage objects of the SG or data set identified by processing of the FIGS. 3A and 3B as critical or important (e.g., exceed the DB size threshold and have the highest SLO), and as having a high level of I/O activity (e.g., determined in the step 116). Additionally, for the storage objects identified, it has been determined that I/O performance is critical or important for an application accessing the storage objects.

In at least one embodiment, the storage objects of the SG identified and sent in the step 118 to the compression engine may identify any storage objects, such as representing any physical and/or logical entity, supported in the embodiment. For example, the storage objects may include file-based storage objects (e.g., one or more file systems, one or more directories, one or more files), LUNs or logical devices, portions of LUNs or logical devices (e.g., a first portion of the LUN's logical address range), one or more virtual devices (e.g., as used by virtual machines), and the like. With respect to a LUN, it may be that multiple data sets both store data to the same LUN. For example, a first data set may be defined that stores its data on a first portion of the LUN's logical addresses and a second data set may be defined that stores its data on the remaining portion of the LUN's logical addresses. In this case where the processing is performed with respect to the first data set, the list of storage objects identified would include the first portion of the LUN but not the remaining portion of the LUN. In this manner, the information sent to the compression engine identifying critical or important and high activity data may identify a portion of less than an entire LUN depending on the particular embodiment.

Generally, the compression engine may use the list of identified SG LUNs or other storage objects in any suitable manner in connection with its processing. The compression engine may use the list of identified LUNs characterized as important or critical, requiring high I/O performance, and having a high I/O activity level in connection with determining whether or not to compress data written to the LUNs. For example, in at least one embodiment where the compression engine performs ABC, the compression engine may determine not to compress any data stored on any LUN of the SG. The foregoing and other possible uses are described in more detail elsewhere herein.

Figure 4:
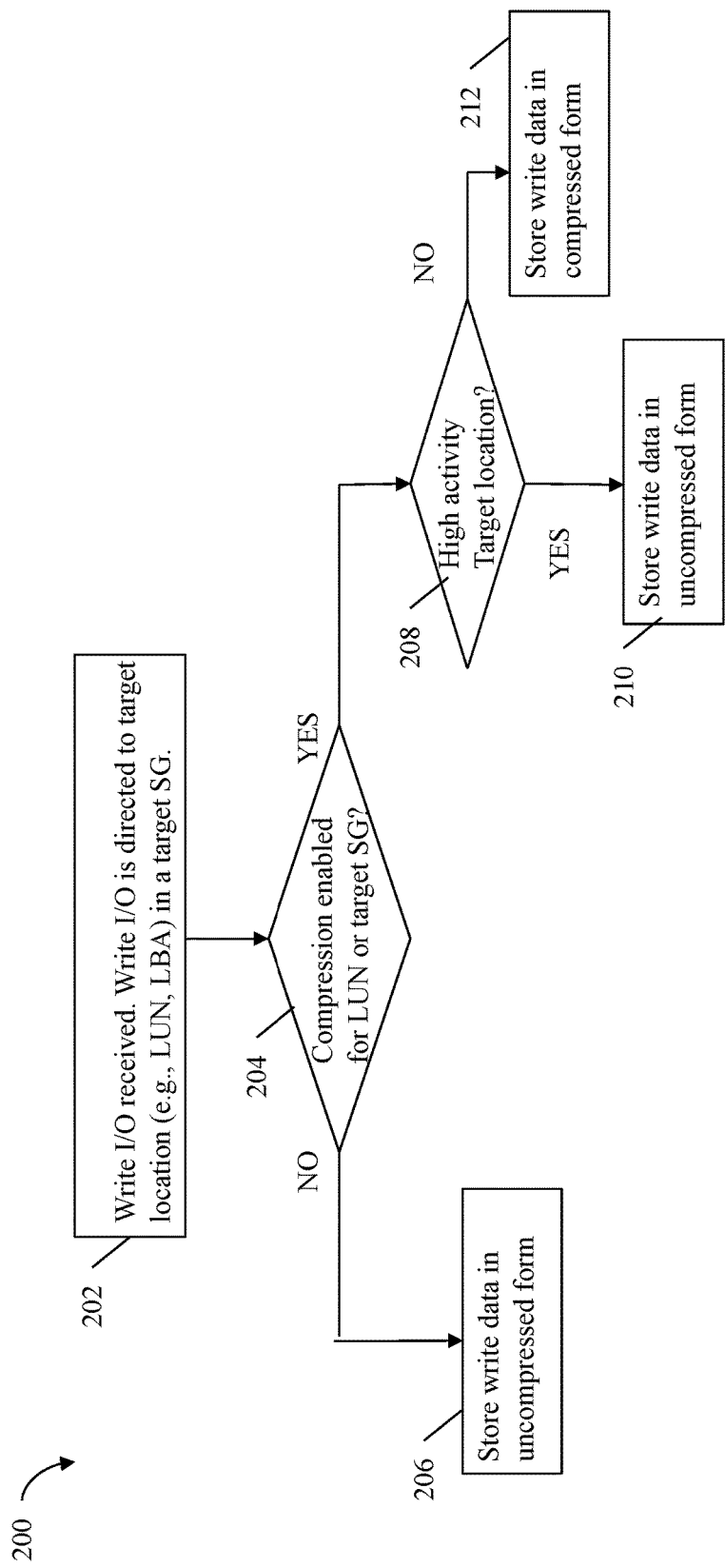

Referring to FIG. 4, shown is another flowchart of processing steps that may be performed in an embodiment in accordance with the techniques herein. The flowchart 200 outlines processing that may be performed inline as part of the I/O or data path by the compression engine in at least one embodiment in accordance with the techniques herein where the compression engine performs ABC.

At the step 202, a write I/O is received. The write I/O writes data to a target location, such as a LUN and logical offset or logical block address (LBA) within the logical address range of the LUN. The LUN is included in a target SG. From the step 202, control proceeds to the step 204. At the step 204, processing is performed to determine whether compression is enabled for the LUN or the target SG. In at least one embodiment, compression settings may be specified on a per-LUN basis identifying whether compression processing is to be performed for the LUN. If enabled, step 204 evaluates to yes, and otherwise the compression setting is disabled and step 204 evaluates to no. As a variation, a compression setting may be specified as the per SG basis and may apply to all LUNs in the SG. Generally, an embodiment may have any suitable level of granularity for compression settings applied to different storage objects. For example, an embodiment may support compression settings for file-based storage objects (e.g., per file system, per directory, per file, per logical defined group of files, directories or file systems), for portions of LUNs (e.g., enable compression for a first portion of the LUN's logical address range and disable compression for the remaining portion of the LUN's logical address range), and the like.

If the step 204 evaluates to no, processing proceeds to the step 206 where the write data of the write I/O operation received in step 202 is stored in its uncompressed form. If the step 204 evaluates to yes, processing proceeds to the step 208. At the step 208, a determination is made as to whether the target location is a high activity location exceeding a specified threshold level of activity. If the step 208 evaluates to yes, control proceeds to the step 210 where the write data is store in its uncompressed form. If the step 208 evaluates to no, control proceeds to the step 212 where the write data is store in its compressed form.

In at least one embodiment in accordance with the techniques herein, the processing of the flowchart 200 as performed by the compression engine performing ABC may use the list of identified LUNs from the step 118 in connection with the step 208 determination processing. In particular, the compression engine may consider the identified LUNs of the SG from the step 118 as high activity LUNs whereby any write to any LUN of the SG may result in the step 208 evaluating to yes.

Figure 5:
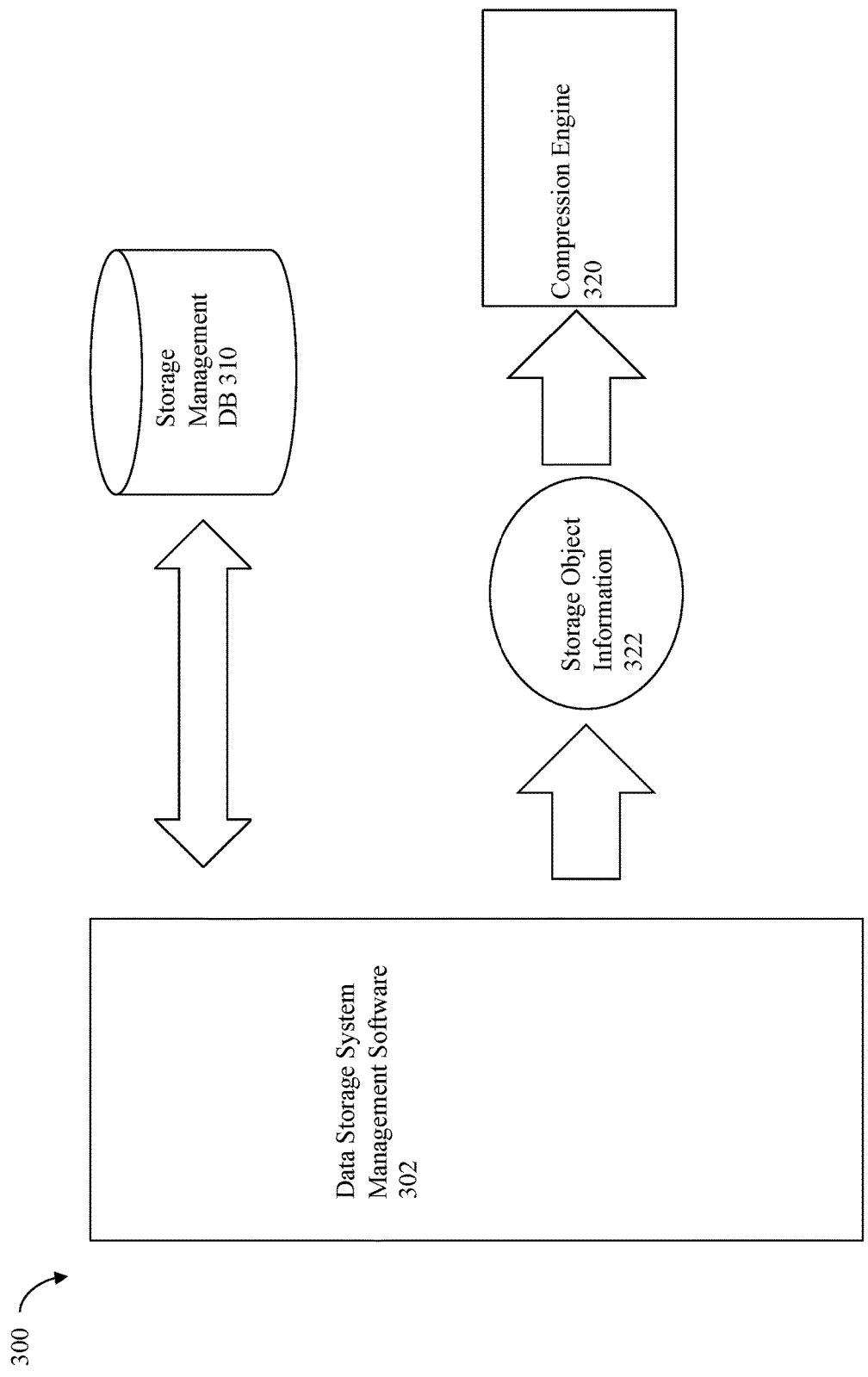
FIG. 5 is an example illustrating components of a data storage system that may be used in an embodiment in accordance with the techniques herein.

Referring to FIG. 5, shown is an example of components that may be used in an embodiment in accordance with the techniques herein. The example 300 illustrates components that may be included in a data storage system performing processing as described herein. The example 300 includes data storage system management software 302, a storage management DB, and a compression engine 320. The storage management DB 310 may store information used by the data storage management software 302 in performing the techniques herein. For example, the storage management DB 310 may include the various thresholds of the criteria. The storage management DB 310 may include collected I/O activity information, the SLO, and the current data set size information for each of the different SGs or other data sets used by different applications.

The data storage system management software 302 may perform processing as described herein such as summarized in FIGS. 3A and 3B. The data storage system management software 302 may perform processing as described herein to generate storage object information 322 provided as an input to the compression engine 320. Generally, the storage object information 322 may be in any suitable form for use by the compression engine. The compression engine 320 may generally use the storage object information 322 in its decision making process to determine whether to compress or not to compress particular data portions. The compression engine 320 may generally determine whether to compress a particular data portion or not using any suitable method. For example, in at least one embodiment, the compression engine 320 may perform ABC as described herein.

In at least one embodiment as described herein, the storage object information 322 may identify one or more LUNs of an SG used by a DB application whereby the identified LUNs are considered important or critical, have a high desired target I/O performance (e.g., have a specified SLO level such as DIAMOND), and are also determined to have a high level of I/O activity (e.g., having an I/O activity level that exceeds a specified threshold level or condition). The identified LUNs or other storage objects included in the information 322 may be the LUNs or other storage objects of the SG as identified in the step 118 of the FIG. 3B. The compression engine 320 may use this information 322 in its decision making process in any suitable manner. For example, the engine 320 may perform ABC and choose not to compress any data written to the identified LUNs included in 322 due to the determined high activity level and the fact that the LUNs are used by an application characterized as I/O performance critical and important. The engine 320 may choose to use this information 322 in combination with possibly other information to determine whether to compress or not compress data written to the identified LUNs of 322. The engine 320 may reduce the frequency of further assessments made with respect to writes to the LUNs identified in the information 322. The engine 320 may, for example, perform selective monitoring to include only those LUNs identified in the information 322. In this latter case, the engine 320 may attempt to reduce the amount of monitoring and evaluating it performs and may limit processing performed of whether to compress or not based on current activity to just a subset of all the LUNs identified as in the information 322. For all other LUNs, the engine 320 may make a decision of whether to compress or not based on the particular setting of enabled or disabled associated with the SG or LUN.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of evaluating data sets for compression processing comprising: receiving first information for a data set that is currently stored on a data storage system, the first information including I/O activity information for the data set, a service level objective for the data set, and a size of the data set, wherein the size of the data set denotes a total amount of a current storage capacity used to store the data set on the data storage system; determining, in accordance with the first information, whether the data set meets criteria indicating a specified level of importance and a specified level of I/O activity, including determining whether at least one of the following three criteria are met; the service level objective meets a minimum service level objective threshold, the size of the data set meets a minimum size threshold; and I/O activity for the data set meets a minimum I/O activity threshold, wherein, if it is determined that the service level objective criteria is not met before determining whether one or more of the other two criteria are met, refraining from determining whether the one or more of the other two criteria are met; and responsive to determining the data set meets the criteria, including determining that: the service level objective meets the predefined minimum service level threshold, the size of the data set meets the predefined minimum size threshold and the I/O activity for the data set meets a minimum I/O activity threshold; sending to the compression engine second information identifying one or more storage objects of the data set as having the specified level of importance and at least the specified level of I/O activity.

2. The method of claim 1, wherein the minimum service level objective threshold is one of a plurality of predetermined service level objectives.

3. The method of claim 2, wherein the minimum service level objective threshold is a first of the plurality of predetermined service level objectives, and the first service level objective denotes a highest service level of the plurality of service levels.

4. The method of claim 1, wherein the criteria indicates that the data set is characterized as having a high level of I/O activity if an average observed I/O rate for the data set exceeds a first threshold.

5. The method of claim 1, wherein the data set is a storage group of the one or more storage objects.

6. The method of claim 5, wherein the storage objects include logical devices.

7. The method of claim 5, wherein at least one storage object corresponds to a portion of a logical address space of a logical device.

8. The method of claim 5, wherein the storage objects include file-based storage objects.

9. The method of claim 8, wherein the storage objects include a directory, and wherein the storage objects further include any one or more of: a file and a file system.

10. The method of claim 5, wherein the storage objects include one or more virtual storage devices used by virtual machines.

11. The method of claim 1, wherein the criteria indicates that the data set is characterized as having a high level of I/O activity if a measured I/O rate for the data set exceeds a maximum I/O rate at least a specified number of times within a specified time period.

12. The method of claim 1, wherein the performed processing is offline processing on the data set as stored on a data storage system.

13. The method of claim 1, wherein meeting the criteria, including the service level objective meeting the predefined minimum service level threshold, the size of the data set meeting the predefined minimum size threshold and the I/O activity for the data set meeting a minimum I/O activity threshold, qualifies the dataset for consideration for not being compressed by a compression.

14. A system comprising: a processor; and a memory comprising code stored thereon that, when executed, performs a method of evaluating data sets for compression processing comprising; receiving first information for a data set that k currently stored on a data storage system, the first information it I/O activity information for the data set, a service level objective for the data set, and a size of the data set, wherein the size of the data set denotes a total amount of current storage capacity used to store the data set; determining, in accordance with the first information, whether the data set meets criteria indicating a specified level of importance and a specified level of I/O activity, wherein the size of the data set is an indicator of an importance of the data set, and wherein the criteria indicates that the size of the data set be at least a minimum size including determining whether at least one of the following three criteria are met: the service level objective meets a minimum service level objective threshold, size of the data set meets a minimum size threshold, and I/O activity for the data set meets a minimum I/O activity threshold, wherein, if it is determined that the service level objective criteria is not met before determining whether one or more of the other two criteria are met, refraining from determining whether the one or more of the other two criteria are met; and responsive to determining the data set meets the criteria, including determining that: the service level objective meets the predefined minimum service level threshold, the size of the data set meets the predefined minimum size threshold and the I/O activity for the data set meets a minimum I/O activity threshold, sending to the compression engine second information identifying one or more storage objects of the data set as having the specified level of importance and at least the specified level of I/O activity.

15. A non-transitory computer readable medium comprising code stored thereon that, when executed, performs a method of evaluating data sets for compression processing comprising: receiving first information for a data set that is currently stored on a data storage system, the first information including I/O activity information for the data set, a service level objective for the data set, and a size of the data set, wherein the size of the data set denotes a total amount of current storage capacity used to store the data set; determining, in accordance with the first information, whether the data set meets criteria indicating a specified level of importance and a specified level of I/O activity, including determining whether at least one of the following three criteria are met: the service level objective meets a minimum service level objective threshold, the size of the data set meets a minimum size threshold, and I/O activity for the data set meets a minimum I/O activity threshold, wherein, if it is determined that the service level objective criteria is not met before determining whether one or more of the other two criteria are met, refraining from determining whether the one or more of the other two criteria are met; and responsive to determining the data set meets the criteria, including determining that: the service level objective meets the predefined minimum service level threshold, the size of the data set meets the predefined minimum size threshold and the I/O activity for the data set meets a minimum I/O activity threshold, sending to the compression engine second information identifying one or more storage objects of the data set as having the specified level of importance and at least the specified level of I/O activity.

16. The non-transitory computer readable medium of claim 15, wherein the criteria indicates that the data set is characterized as having a high level of I/O activity if an average observed I/O rate for the data set exceeds a first threshold, or if a measured I/O rate for the data set exceeds a maximum I/O rate at least a specified number of times within a specified time period.

* * * * *